United States Patent
Liu et al.

(10) Patent No.: US 11,736,007 B2
(45) Date of Patent: *Aug. 22, 2023

(54) RESONANT SWITCHING POWER CONVERTER HAVING CHARGING/DISCHARGING DURATION PERIOD RELATED TO CHARGING/DISCHARGING RESONANT FREQUENCY

(71) Applicant: Richtek Technology Corporation, Zhubei (TW)

(72) Inventors: Kuo-Chi Liu, Hsinchu (TW); Chung-Lung Pai, Hsinchu (TW)

(*) Notice: Subject to any disclaimer, the term of this patent is extended or adjusted under 35 U.S.C. 154(b) by 118 days.

This patent is subject to a terminal disclaimer.

(21) Appl. No.: 17/221,767

(22) Filed: Apr. 2, 2021

(65) Prior Publication Data
US 2021/0351695 A1 Nov. 11, 2021

Related U.S. Application Data

(60) Provisional application No. 63/021,655, filed on May 7, 2020.

(30) Foreign Application Priority Data
Sep. 15, 2020 (TW) .................................. 109131753

(51) Int. Cl.
*H02M 3/07* (2006.01)
*H02M 3/155* (2006.01)
(Continued)

(52) U.S. Cl.
CPC ............. *H02M 3/155* (2013.01); *H02M 3/01* (2021.05); *H02M 3/07* (2013.01); *H02M 1/0095* (2021.05)

(58) Field of Classification Search
CPC .......................... H02M 3/01; H02M 3/07–078
See application file for complete search history.

(56) References Cited

U.S. PATENT DOCUMENTS 9,831,776 B1    11/2017  Jiang et al.
9,917,517 B1    3/2018   Jiang et al.
(Continued)

FOREIGN PATENT DOCUMENTS

KR    20060004229 A  *  1/2006  .............. H02M 3/07

OTHER PUBLICATIONS

Won et al. Korean Patent. Machine translation of KR 20060004229 A. (Year: 2006).*

*Primary Examiner* — Peter M Novak
(74) *Attorney, Agent, or Firm* — Huan-Yi Lin

(57) ABSTRACT

A resonant switching power converter includes: capacitors; switches; one charging inductor; and one discharging inductor. In a charging process, by switching the switches, the capacitors and the charging inductor form a charging path between an input voltage and an output voltage, wherein a turned-ON time point and a turned-OFF time point of the switches are synchronous with a start time point and an end time point of a positive half wave of a charging resonant current. In a discharging process, by switching the switches, each capacitor and the discharging inductor are connected in series between the output voltage and a ground voltage level, whereby plural discharging paths are formed, wherein a turned-ON time point and a turned-OFF time point of the switches are synchronous with a start time point and an end time point of a positive half wave of a discharging resonant current.

14 Claims, 10 Drawing Sheets

(51) Int. Cl.
  *H02M 3/00*    (2006.01)
  *H02M 1/00*    (2006.01)

(56) References Cited

U.S. PATENT DOCUMENTS

2021/0175805 A1\* 6/2021 Mercer .................. H02M 1/08
2021/0288581 A1\* 9/2021 Zhu .................... H02M 1/0048

\* cited by examiner

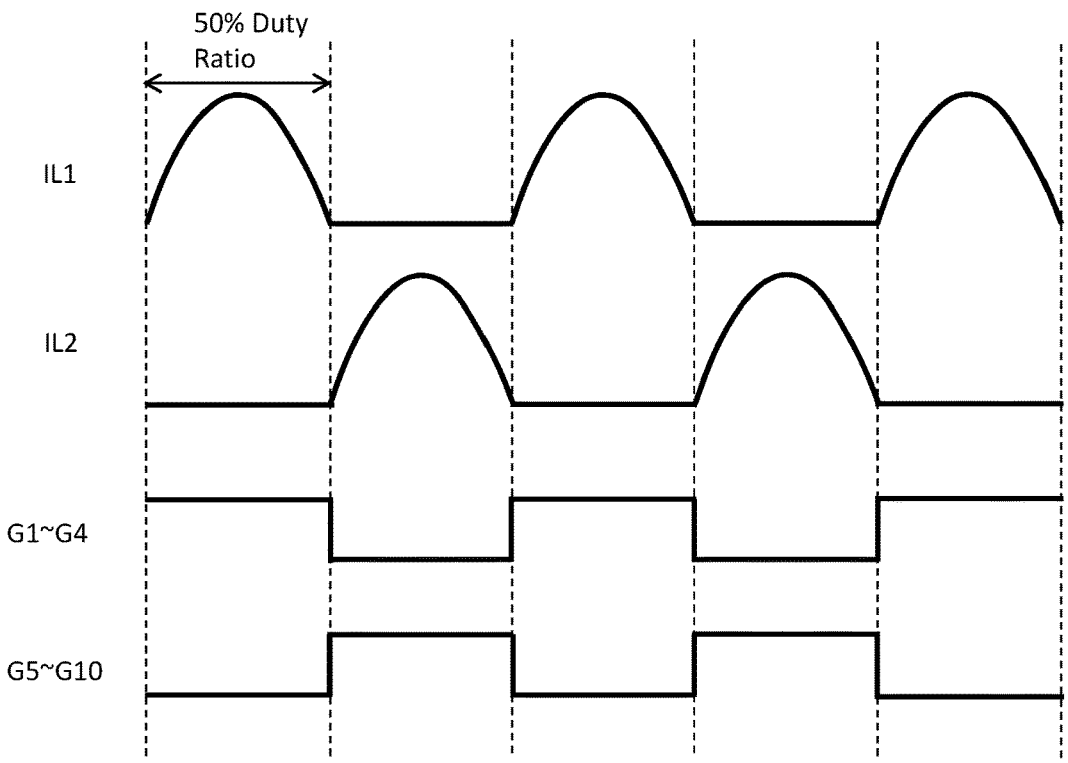
Fig. 5A
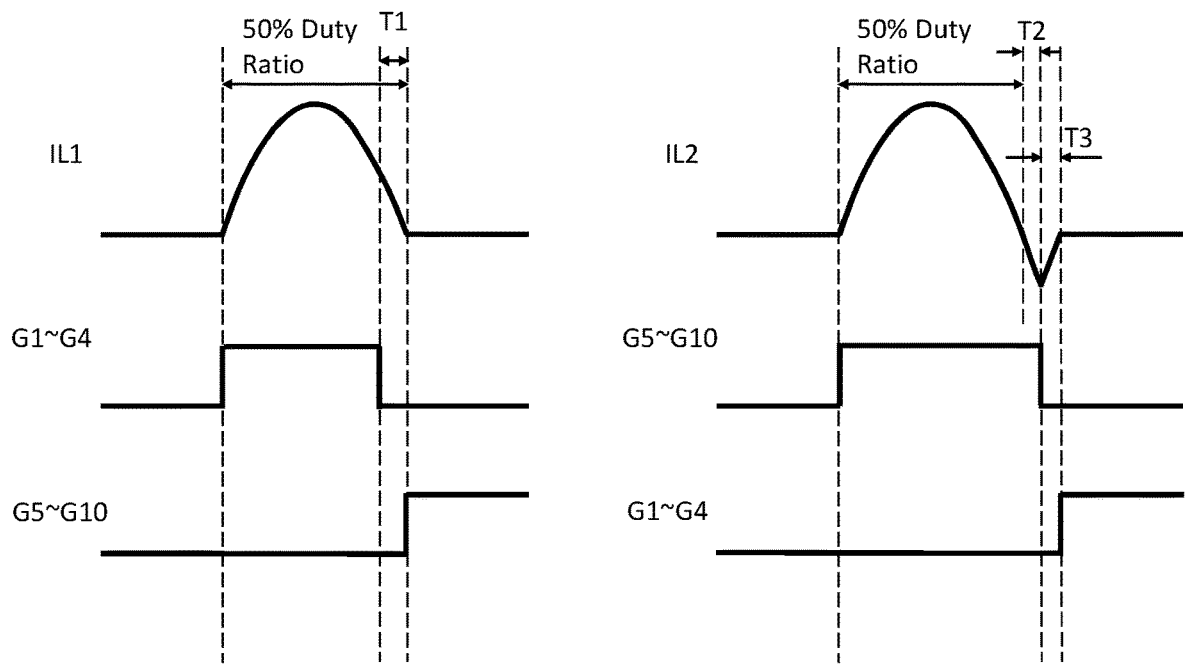
Fig. 5B
Fig. 5C

RESONANT SWITCHING POWER CONVERTER HAVING CHARGING/DISCHARGING DURATION PERIOD RELATED TO CHARGING/DISCHARGING RESONANT FREQUENCY

CROSS REFERENCE

The present invention claims priority to U.S. 63/021,655 filed on May 7, 2020 and claims priority to TW 109131753 filed on Sep. 15, 2020.

BACKGROUND OF THE INVENTION

Field of Invention

The present invention relates to a resonant switching power converter; particularly, it relates to such resonant switching power converter whose charging/discharging duration period is related to its charging/discharging resonant frequency.

Description of Related Art

Please refer to FIG. 1, which shows a schematic diagram of a conventional power converter. Under a charging operation, switches Q1, Q3, Q5, Q8 and Q9 are ON, whereas, switches Q2, Q4, Q6, Q7 and Q10 are OFF, so that a series connection of a capacitor C1 and an inductor L1 is formed between an input voltage VIN and an output voltage VOUT and a series connection of a capacitor C2, a capacitor C3 and an inductor L2 is formed between a ground voltage level and the output voltage VOUT. On the other hand, under a discharging operation, switches Q2, Q4, Q6, Q7 and Q10 are ON, whereas, switches Q1, Q3, Q5, Q8 and Q9 are OFF, so that a series connection of the inductor L1, the capacitor C1 and the capacitor C2 is formed between the ground voltage level and the output voltage VOUT and a series connection of the inductor L2 and the capacitor C3 is formed between the ground voltage level and the output voltage VOUT. It is required for the capacitors of this conventional power converter to withstand a relatively higher rated voltage. For example, the DC bias voltage of the capacitor C1 (i.e. the average of Vc1) is three times the level of the output voltage VOUT (i.e., the DC bias voltage of Vc1=3VOUT); the DC bias voltage of the capacitor C2 (i.e. the average of Vc2) is two times the level of the output voltage VOUT (i.e., the DC bias voltage of Vc2=2VOUT); the DC bias voltage of the capacitor C3 (i.e. the average of Vc3) is equal to the level of the output voltage VOUT (i.e., the DC bias voltage of Vc3=VOUT). Because the required DC bias voltage levels of the capacitors are relatively higher, it is required for this conventional power converter to utilize capacitors having a larger size. Additionally, the capacitance of a capacitor usually decreases as its DC bias voltage increases. In a case where a level of the input voltage VIN ranges between 36V and 76V, the DC bias voltage level of the capacitor C1 will range between 27V and 57V. The wide variation range of the DC bias voltage level leads to the wide variation range of the capacitance of the capacitor; as a result, the resonant frequency of this conventional power converter will vary greatly, resulting in a larger switching power loss, and a complicated control mechanism is required for better power conversion efficiency, but still within its constraints. Moreover, the voltage conversion ratio of the input voltage to the output voltage of this conventional power converter is limited to be 4:1 or 2:1; that is, this conventional power converter cannot perform voltage conversion of other voltage conversion ratios, such as 3:1.

In view of the above, to overcome the drawbacks in the prior art, the present invention proposes an innovated power converter.

SUMMARY OF THE INVENTION

From one perspective, the present invention provides a resonant switching power converter, which is configured to operably convert an input voltage to an output voltage; the resonant switching power converter comprising: a plurality of capacitors; a plurality of switches, which are coupled to the plurality of capacitors, wherein the plurality of switches switch electrical connection relationships of the plurality of capacitors according to corresponding operation signals; one or plural inductors, wherein the plural inductors respectively serve as at least one charging inductor and at least one discharging inductor, or the one inductor serves both as the at least one charging inductor and the at least one discharging inductor, wherein the at least one charging inductor is connected in series to at least one of the plurality of capacitors, and the at least one discharging inductor is connected in series to at least one of the plurality of capacitors; wherein in a charging process, by switching the switches, a series connection of the plurality of capacitors and the at least one charging inductor is formed between the input voltage and the output voltage, whereby a single charging path is formed, wherein a turned-ON time point and a turned-OFF time of the switches in the charging process are synchronous with a start time point and an end time point of a positive half wave of a charging resonant current of the charging process; wherein in a discharging process, by switching the switches, each capacitor and one of the at least one discharging inductor are connected in series between the output voltage and a ground voltage level, whereby a plurality of discharging paths are formed, wherein a turned-ON time point and a turned-OFF time of the switches in the discharging process are synchronous with a start time point and an end time point of a positive half wave of a discharging resonant current of the discharging process; wherein the charging process and the discharging process are arranged in a repeated, alternating manner, so as to convert the input voltage to the output voltage.

In one embodiment, the at least one charging inductor is one single charging inductor and the at least one discharging inductor is one single discharging inductor, wherein in the discharging process, by switching the switches, a parallel connection of the plurality of capacitors is formed, which is connected in series to the single discharging inductor.

In one embodiment, an inductance of the single charging inductor is equal to an inductance of the single discharging inductor.

In one embodiment, the at least one charging inductor and the at least one discharging inductor are one same single inductor, wherein in the discharging process, by switching the switches, a parallel connection of the plurality of capacitors is formed, which is connected in series to the same single inductor.

In one embodiment, in the charging process and in the discharging process, the resonant switching power converter changes a voltage conversion ratio of the input voltage to the output voltage by keeping at least one of the plurality of switches to be ON and keeping at least two of the plurality of switches to be OFF.

In one embodiment, the resonant switching power converter further comprises: a previous stage converter having a previous stage inductor, wherein the previous stage inductor is configured to operably assist the at least one charging inductor.

In one embodiment, the previous stage converter includes: a buck converter, a boost converter, a buck-boost converter, an inverting converter or an inverting-boost converter.

In one embodiment, the charging process has a charging resonant frequency, whereas, the discharging process has a discharging resonant frequency, and wherein the charging resonant frequency is identical to the discharging resonant frequency.

In one embodiment, the charging process has a charging resonant frequency, whereas, the discharging process has a discharging resonant frequency, and wherein the charging resonant frequency is different from the discharging resonant frequency.

In one embodiment, a zero voltage switching is achieved by adjusting a duration period of the charging process.

In one embodiment, a zero voltage switching is achieved by adjusting a duration period of the discharging process.

In one embodiment, the resonant switching power converter is a bi-directional resonant switching power converter.

In one embodiment, a voltage conversion ratio of the input voltage to the output voltage of the resonant switching power converter is 4:1, 3:1 or 2:1.

In one embodiment, a duration period of the charging process does not overlap with a duration period of the discharging process.

In one embodiment, the resonant switching power converter further comprises: a controller, which is coupled to the plurality of switches, wherein the controller is configured to operably generate the operation signals.

One advantage of the present invention is that: the present invention can reduce the number of the inductor to only one single inductor. Such one single inductor can function as a charging inductor or a discharging inductor at different periods.

The present invention is also advantageous in that: the present invention can reduce voltage stress; all capacitors can have an identical rated current and an identical rated voltage; capacitors of a smaller size can be used. Moreover, under such case, the present invention can perform resonant operation, so as to achieve soft switching such as zero current switching (ZCS) or zero voltage switching (ZVS).

The present invention is also advantageous in that: the present invention can adjust the voltage conversion ratio in a more flexible fashion, and, the present invention can combine the inductor with a previous stage converter. Furthermore, the present invention can perform bi-directional operation.

The objectives, technical details, features, and effects of the present invention will be better understood with regard to the detailed description of the embodiments below, with reference to the attached drawings.

BRIEF DESCRIPTION OF THE DRAWINGS

FIGS. 5A-5C illustrate waveform diagrams of operation signals and inductor currents corresponding to a charging process and a discharging process.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
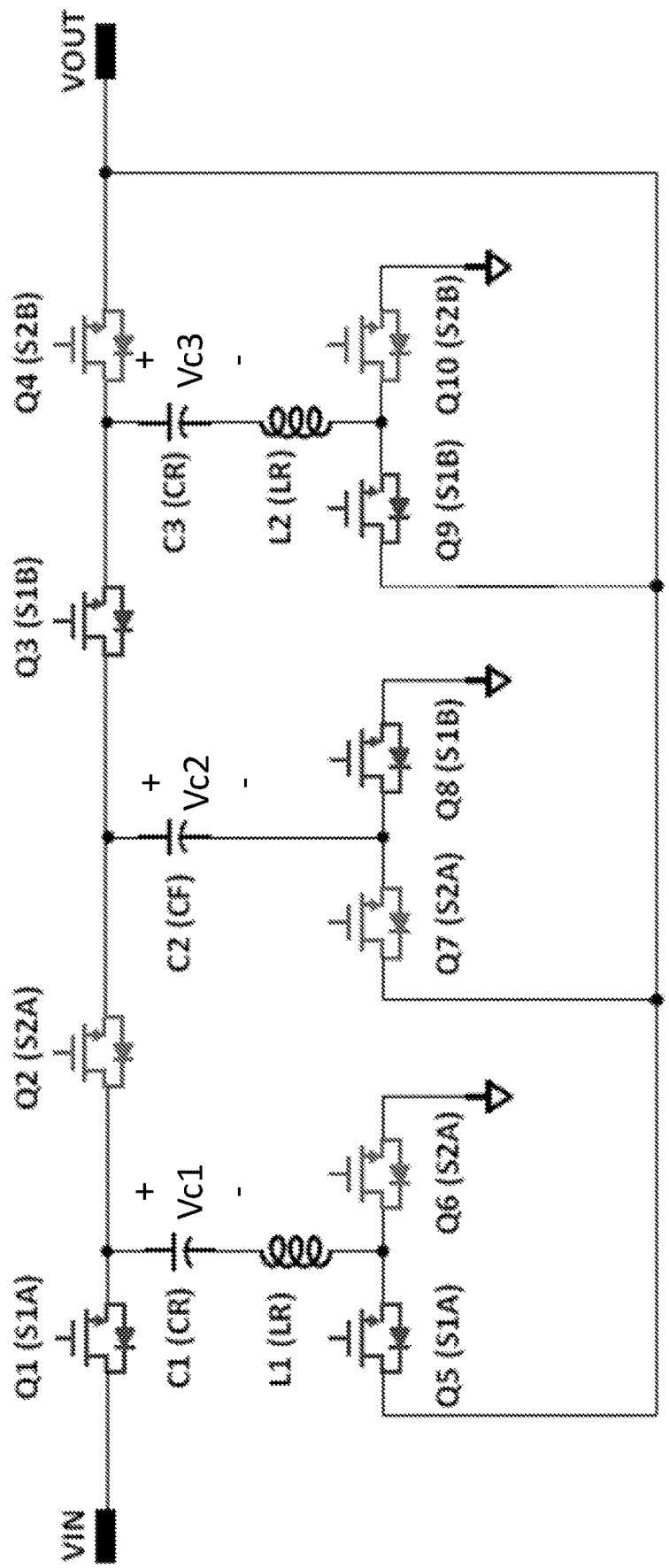
FIG. 1 shows a schematic diagram of a conventional power converter.
Figure 2A:
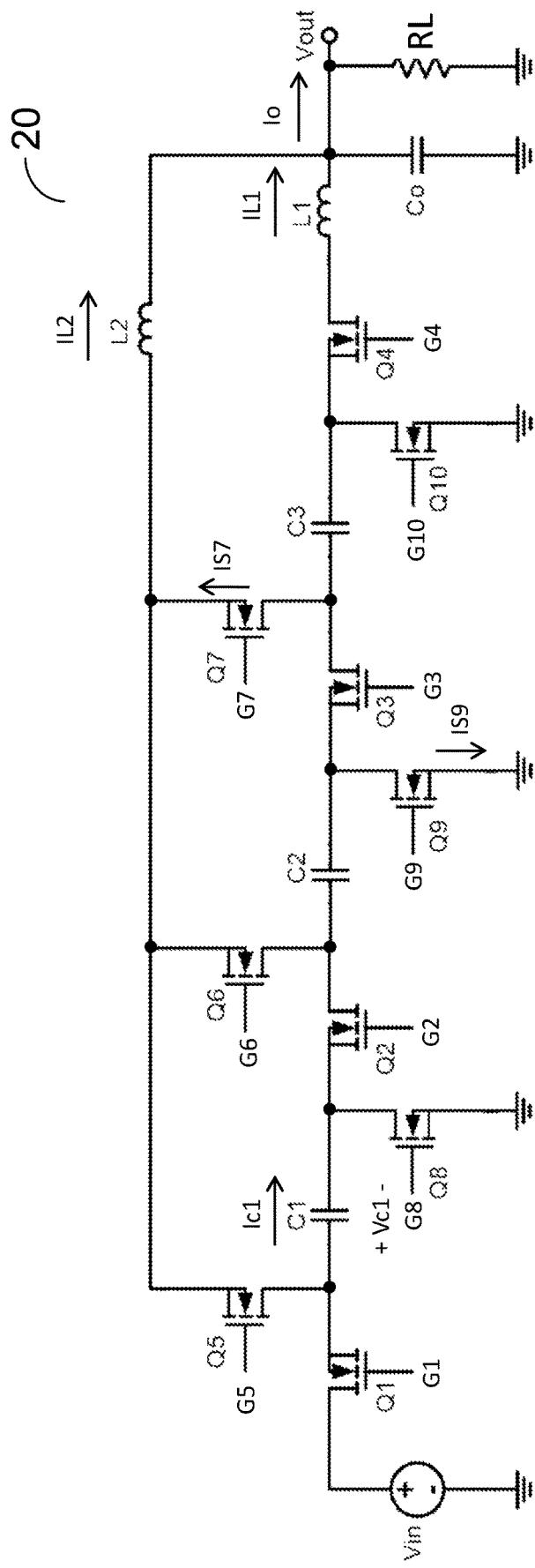
FIG. 2A shows a schematic circuit diagram of a resonant switching power converter according to an embodiment of the present invention.
Figure 2B:
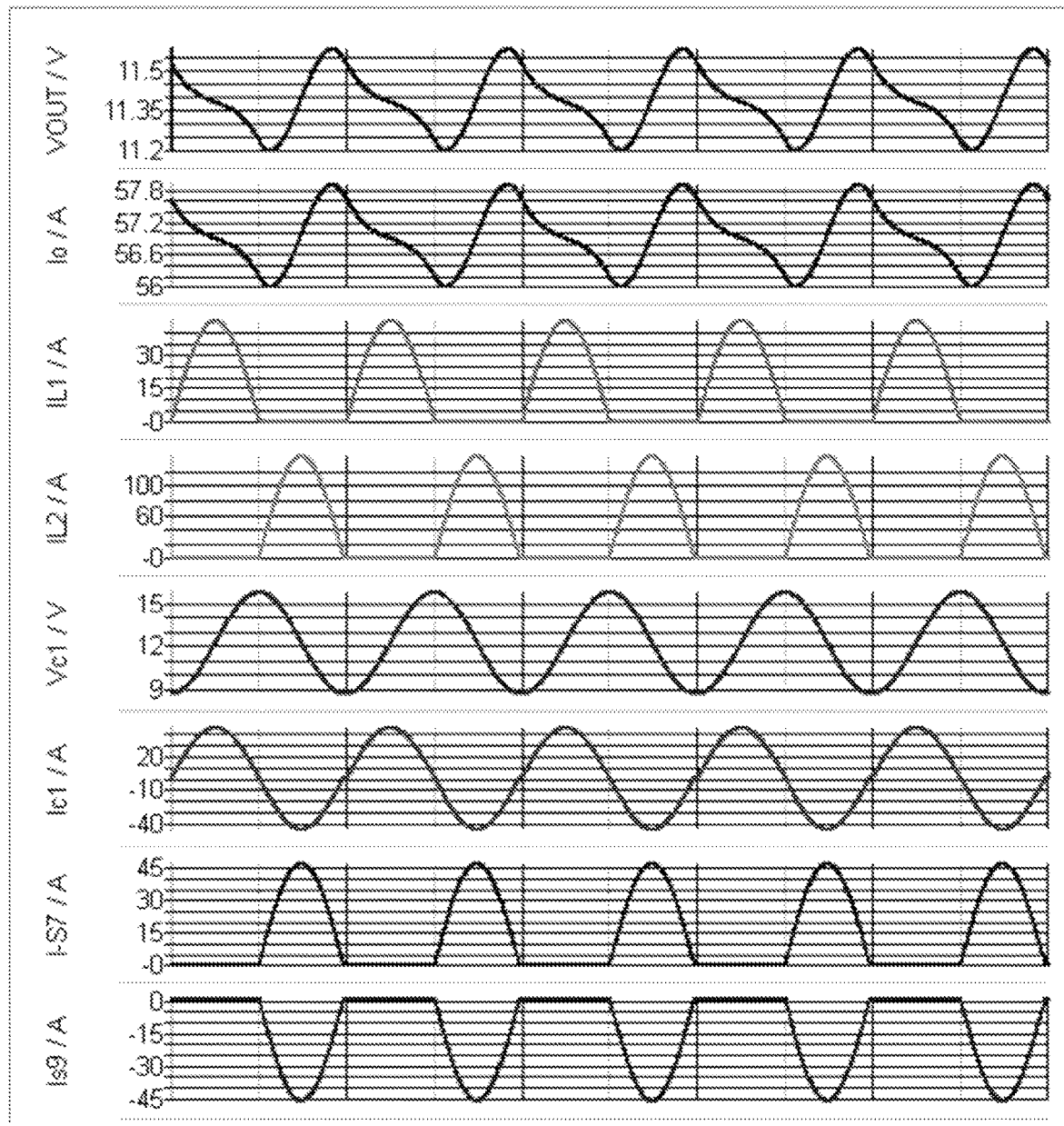
FIG. 2B illustrates waveform diagrams of relevant signals related to the operation of FIG. 2A.

Please refer to FIG. 2A and FIG. 2B. FIG. 2A shows a schematic circuit diagram of a resonant switching power converter according to an embodiment of the present invention. FIG. 2B illustrates waveform diagrams of relevant signals related to the operation of FIG. 2A. This embodiment comprises several capacitors, but they share one charging inductor or one discharging inductor. That is, regardless of how many capacitors there are, this embodiment requires only one charging inductor and only one discharging inductor. As a result, this embodiment can significantly reduce the required number of the inductors. As shown in FIG. 2A, the resonant switching power converter 20 of the present invention comprises: capacitors C1, C2 and C3, switches Q1, Q2, Q3, Q4, Q5, Q6, Q7, Q8, Q9 and Q10, a charging inductor L1 and a discharging inductor L2. The switches Q1, Q2 and Q3 are connected in series to the corresponding capacitors C1, C2 and C3, respectively. The switch Q4 is connected in series to the charging inductor L1. Certainly, it should be understood that the implementation of the number of the capacitors of the resonant switching power converter 20 as three in the above-mentioned preferred embodiment is only an illustrative example, but not for limiting the broadest scope of the present invention. In other embodiments, it is also practicable and within the scope of the present invention that the number of the capacitors of the resonant switching power converter 20 can be any plural number other than three. It should be understood that the number of a device in the embodiments of the present invention is only an illustrative example, but not for limiting the broadest scope of the present invention, unless emphasized as an important feature.

As shown in FIG. 2A, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 2A, the other ends of the switches Q5-Q7 are commonly electrically connected to a node which is connected to the discharging inductor L2. The other ends of the switches Q8-Q10 are commonly coupled to the ground voltage level. The other ends of the charging inductor L1 and the discharging inductor L2 are commonly coupled to the output voltage Vout. The other end of the switch Q1 is coupled to input voltage Vin. (A switch is regarded as a two-end device in this specification. Its control terminal is not regarded as an "end".)

The switches Q1-Q10 can respectively switch electrical connection relationships between the corresponding capacitors C1-C3 with the charging inductor L1 and the discharging inductor L2 according to corresponding operation signals. In a charging process, the switches Q1-Q4 are ON, whereas, the switches Q5-Q10 are OFF, so that a series connection of the capacitors C1-C3 and the charging inductor L1 is formed between the input voltage Vin and the output voltage Vout, which forms a single charging path. In a discharging process, the switches Q5-Q10 are ON, whereas, the switches Q1-Q4 are OFF, so that a parallel connection of the capacitors C1, C2 and C3 is connected in series to the discharging inductor L2, which forms plural discharging paths. It is noteworthy that, in one embodiment, the above-mentioned charging process and the above-mentioned discharging process are arranged at different periods in a repeated, alternating manner. That is, the above-mentioned charging process and the above-mentioned discharging process are not performed at the same time. In one embodiment, a duration period of the charging process does not overlap with a duration period of the discharging process. In one embodiment, the charging process and the discharging process are arranged in a repeated, alternating manner, so as to convert the input voltage Vin to the output voltage Vout. In this embodiment, the DC bias voltages of the capacitors C1, C2 and C3 all are Vo. Thus, as compared to the prior art, under the same input voltage and the same output voltage, the first capacitors C1, C2 and C3 of this embodiment will only need to withstand a relatively lower rated voltage. Hence, this embodiment can utilize capacitors having a smaller size.

In one embodiment, the charging resonant frequency of the above-mentioned charging process is identical to the discharging resonant frequency of the above-mentioned discharging process. In one embodiment, the charging resonant frequency of the above-mentioned charging process is different from the discharging resonant frequency of the above-mentioned discharging process. In one embodiment, the above-mentioned resonant switching power converter 20 can be a bi-directional resonant switching power converter. As one of average skill in the art readily understands, "bi-directional power converter" refers to a power converter whose input terminal (the input voltage Vin) and output terminal (the output voltage Vout) are interchangeable. That is, in the embodiment shown in FIG. 2A, the resonant switching power converter 20 can convert the output voltage Vout to the input voltage Vin. In one embodiment, the voltage conversion ratio of the input voltage Vin to the output voltage Vout of the above-mentioned resonant switching power converter 20 is 4:1, 3:1 or 2:1.

In one embodiment, the duration period (Ton1) of the above-mentioned charging process is correlated with the charging resonant frequency (fr1) of the above-mentioned charging process. In one embodiment, the duration period (Ton1) of the above-mentioned charging process is correlated with a positive half wave of a charging resonant current of the charging process. For example, the turned-ON time points and turned-OFF time points of the switches Q1-Q4 are arranged to be substantially synchronous with the start time point and end time point of the positive half wave of the charging resonant current of the charging process. In one embodiment, the duration period (Ton2) of the above-mentioned discharging process is correlated with the discharging resonant frequency (fr2) of the above-mentioned discharging process. In one embodiment, the duration period (Ton2) of the above-mentioned discharging process is correlated with a positive half wave of a discharging resonant current of the discharging process. For example, the turned-ON time points and turned-OFF time points of the switches Q5-Q10 are arranged to be substantially synchronous with the start time point and end time point of the positive half wave of the discharging resonant current of the discharging process.

In the embodiment where the charging resonant frequency (fr1) of the above-mentioned charging process is equal to the discharging resonant frequency (fr2) of the above-mentioned discharging process, when the duration period (Ton1) of the above-mentioned charging process is equal to the duration period (Ton2) of the above-mentioned discharging process (e.g., when the duration period (Ton1) of the above-mentioned charging process is substantially equal to 50% of the duty cycle period), a switch can be switched at a time point when the current flowing therethrough is at a very low level of its positive half wave, so that soft switching can be achieved. In one embodiment, a zero current switching (ZCS) can be achieved.

Note that, although it is preferred for the duration period of the charging process to be equal to the duration period of the discharging process (i.e., the duration period of the charging process and the duration period of the discharging process are each equal to 50% of the duty cycle period), so that a zero current switching of soft switching can be achieved, however due to non-idealities caused by for example imperfection of components or imperfect matching among components, the duration period of the charging process may not be equal to exactly 50% of the duty cycle period, but just close to 50% of the duty cycle period. In other words, according to the present invention, a certain level of error between the duration period of the charging process and 50% of the duty cycle period is acceptable, and therefore the term "substantially" is used in this specification to mean that an insignificant error within a tolerable range is acceptable.

In one embodiment, the duration period of the above-mentioned charging process is smaller than a specific ratio of duty cycle period by a predetermined period. For example, the duration period of the above-mentioned charging process is smaller than 50% of the duty cycle period by a predetermined period. Thus, after the switches Q1-Q4 have been turned OFF, a little amount of current remains, which flows through the charging inductor L1 to take away accumulated charges stored in a parasitic capacitor of the switch Q10 via the parasitic diode of the switch Q4, so that the voltage across the switch Q10 can be reduced, thus achieving soft switching. In one embodiment, a zero voltage switching (ZVS) can be achieved by adjusting the predetermined period.

In one embodiment, the duration period of the above-mentioned discharging process is larger than a specific ratio of duty cycle period by a second predetermined period. For example, the duration period of the above-mentioned discharging process is larger than 50% of the duty cycle period by a second predetermined period. Thus, during the delayed turned-OFF period of the switches Q5-Q10, a negative current of the discharging inductor L2 will flow through a parasitic diode of the switch Q5, to charge a parasitic capacitor of the switch Q1. As a result, the voltage across the switch Q1 will be reduced, for achieving soft switching. In one embodiment, a zero voltage switching (ZVS) can be achieved through adjusting the predetermined period.

The charging resonant frequency (fr1) of the above-mentioned charging process and the discharging resonant frequency (fr2) of the above-mentioned discharging process can be represented by following equations:

$$fr1 = \frac{1}{2\pi\sqrt{L1 \times (C1 // C2 // C3)}} \quad (1)$$

$$fr2 = \frac{1}{2\pi\sqrt{L2 \times (C1 + C2 + C3)}} \quad (2)$$

Assuming that C1=C2=C3=Cr and fr1=fr2, the following equation is obtained by combining the equations (1) and (2):

$$\frac{1}{2\pi\sqrt{L1 \times (Cr/3)}} = \frac{1}{2\pi\sqrt{L2 \times 3Cr}}$$

Accordingly, it is derived that the inductance of the charging inductor L1 and the inductance of the discharging inductor L2 should meet the following equation:

$$L2 = \frac{1}{9}L1 \quad (3)$$

That is, if it is intended to let the charging resonant frequency (fr1) of the charging process be equal to the discharging resonant frequency (fr2) of the discharging process (i.e., if it is intended to ensure fr1=fr2), the inductance of the charging inductor L1 and the inductance of the discharging inductor L2 should be selected to comply with the relationship addressed in the equation (3).

FIG. 2B illustrates waveform diagrams of relevant signals related to the operation of FIG. 2A. The waveform diagrams of the output voltage Vout, the output current Io, the charging resonant current IL1, the discharging resonant current IL2, the voltage Vc1 across the capacitor C1, the current Ic1 of the capacitor C1, the current IS7 of the switch Q7 and the current IS9 of the switch Q9 are as shown in FIG. 2B. In this embodiment, the charging resonant frequency is equal to the discharging resonant frequency. And, the duration period of the charging process is equal to the duration period of the discharging process, wherein each of the duration period of the charging process and the duration period of discharging process is substantially equal to 50% of the duty cycle period.

In another embodiment, in a case where the inductance of the charging inductor L1 is equal to the inductance of the discharging inductor L2 and assuming that C1=C2=C3=Cr, the equation (1) and equation (2) can be rewritten and expressed by the following equations:

$$fr1 = \frac{1}{2\pi\sqrt{L1 \times (Cr/3)}}$$

$$fr2 = \frac{1}{2\pi\sqrt{L1 \times 3Cr}}$$

According to the above-mentioned equations, it can be realized that in a case where the inductance of the charging inductor L1 is equal to the inductance of the discharging inductor L2, the charging resonant frequency is not equal to the discharging resonant frequency. Under such situation, if it is intended to achieve ZCS, the duration period (Ton1) and the duration period (Ton2) need to be set as a half period of the corresponding charging resonant frequency (fr1) and a half period of the corresponding discharging resonant frequency (fr2), respectively, which can be represented by the following equations:

$$Ton1 = \frac{1}{2fr1}$$

$$Ton2 = \frac{1}{2fr2}$$

If it is intended to achieve ZCS, in light of the above-mentioned equations, the duration period (Ton1) and the duration period (Ton2) need to comply with the following relationship:

$$\frac{Ton1}{Ton2} = \frac{\frac{1}{2}fr1}{\frac{1}{2}fr2} = \frac{fr2}{fr1} = \frac{2\pi\sqrt{L1 \times (Cr/3)}}{2\pi\sqrt{L1 \times 3Cr}} = \frac{1}{3} \quad (4)$$

That is, in a case where the inductance of the charging inductor L1 is equal to the inductance of the discharging inductor L2, the duration period (Ton2) of the discharging process should be set as three times of the duration period (Ton1) of the charging process. That is, the duration period (Ton1) of the charging process should be substantially equal to 25% of the duty cycle period, whereas, the duration period (Ton2) of the discharging process should be substantially equal to 75% of the duty cycle period; by such arrangement, ZCS can be achieved.

It is noteworthy that, in an implementation where the inductance of the charging inductor L1 is equal to the inductance of the discharging inductor L2, according to one embodiment of the present invention, the charging inductor L1 and the discharging inductor L2 can share one same inductor; that is, one single inductor functions as the charging inductor L1 in a part of its operation time and functions as the discharging inductor L2 in another part of its operation time.

Figure 3:
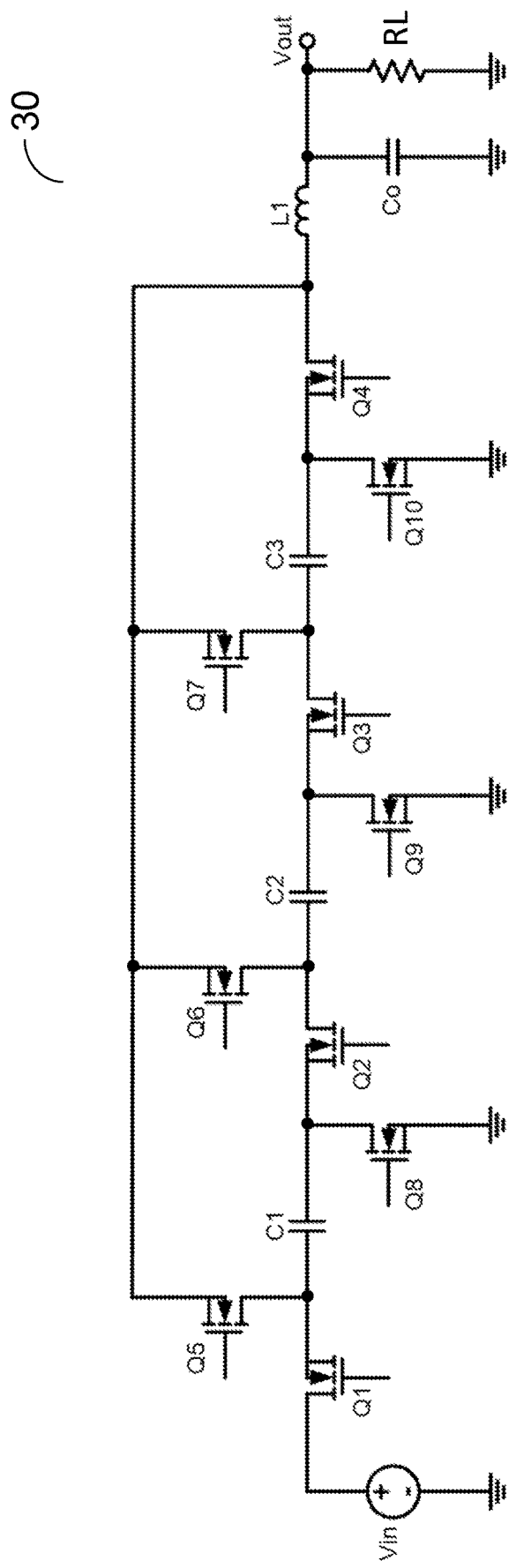
FIG. 3 shows a schematic circuit diagram of a resonant switching power converter according to another embodiment of the present invention.

Please refer to FIG. 3, which shows a schematic circuit diagram of a resonant switching power converter according to another embodiment of the present invention. In this embodiment, the charging inductor and the discharging inductor are one same single inductor L1; such implementation can reduce the required inductor number to minimum. As shown in FIG. 3, the resonant switching power converter 30 of the present invention comprises: capacitors C1, C2 and C3, switches Q1, Q2, Q3, Q4, Q5, Q6, Q7, Q8, Q9 and Q10, an inductor L1. The switches Q1, Q2 and Q3 are connected in series to the corresponding capacitors C1, C2 and C3, respectively. The switch Q4 is connected in series to the inductor L1. Certainly, it should be understood that the implementation of the number of the capacitors of the resonant switching power converter 30 as three in the above-mentioned preferred embodiment is only an illustrative example, but not for limiting the broadest scope of the present invention. In other embodiments, it is also practicable and within the scope of the present invention that the number of the capacitors of the resonant switching power converter 30 can be any multiple number other than three. It should be understood that the number of a device in the embodiments, is only an illustrative example, but not for limiting the broadest scope of the present invention, unless emphasized as a feature.

It is noteworthy that, in this embodiment, the charging inductor and the discharging inductor are one same single inductor L1. In the discharging process, by switching the switches Q1-Q10, the capacitors C1-C3 are connected in parallel and the parallel connection is connected to the same single inductor L1. As one of average skill in the art readily understands by the description above, when the charging inductor and the discharging inductor are one same single inductor L1, a charging resonant current IL1 flows through the same inductor L1 during the charging process, whereas, a discharging resonant current IL2 flows through the same inductor L1 during the discharging process. Neither the charging resonant current IL1 nor the discharging resonant current IL2 will flow through any other inductor.

As shown in FIG. 3, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 3, the other ends of the switches Q5-Q7 are commonly electrically connected to a node which is coupled to a node between the switch Q4 and the inductor L1. The other ends of the switches Q8-Q10 are commonly coupled to the ground voltage level. The other end of the inductor L1 is coupled to the output voltage Vout. The other end of the switch Q1 is coupled to input voltage Vin.

The switches Q1-Q10 can respectively switch electrical connection relationships between the corresponding capacitors C1-C3 and the inductor L1 according to corresponding operation signals. In a charging process, the switches Q1-Q4 are ON, whereas, the switches Q5-Q10 are OFF, so that a series connection of the capacitors C1-C3 and the inductor L1 is formed between the input voltage Vin and the output voltage Vout, which forms a single charging path. In a discharging process, the switches Q5-Q10 are ON, whereas, the switches Q1-Q4 are OFF, so that the capacitors C1, C2 and C3 form a parallel connection, which is connected to the inductor L1, to form plural discharging paths. It is noteworthy that, in one embodiment, the above-mentioned charging process and the above-mentioned discharging process are arranged at different periods in a repeated, alternating manner. That is, the above-mentioned charging process and the above-mentioned discharging process are not performed at the same time. In this embodiment, the DC bias voltages of the capacitors C1, C2 and C3 all are Vo. Thus, the first capacitors C1, C2 and C3 of this embodiment will only need to withstand a relatively lower rated voltage. Hence, this embodiment can utilize capacitors having a smaller size.

In the embodiment where the charging inductor and the discharging inductor are implemented as one same single inductor L1, a zero current switching (ZCS) of soft switching can be achieved by properly arranging a ratio of the duration period (Ton1) of the charging process to the duration period (Ton2) of the discharging process according to the above-mentioned equations. To be more specific, in one embodiment, the duration period of the above-mentioned charging process can be set to for example 25% of the duty cycle period. In this way, a switch can be switched at a time point when the current flowing therethrough is at a very low level of its positive half wave, so as to achieve soft switching. In one embodiment, a zero current switching (ZCS) can be achieved. In one embodiment, the duration period of the above-mentioned charging process is smaller than a specific ratio of duty cycle period by a predetermined period. For example, the duration period of the above-mentioned charging process is smaller than 50% of the duty cycle period by a predetermined period. Thus, after the switches Q1-Q4 have been turned OFF, a little amount of current remains, which flows through the inductor L1 to take away accumulated charges stored in a parasitic capacitor of the switch Q10 via the parasitic diode of the switch Q4, so that the voltage across the switch Q10 can be reduced, thus achieving soft switching. In one embodiment, a zero voltage switching (ZVS) can be achieved by adjusting the predetermined period.

In one embodiment, the duration period of the above-mentioned discharging process is greater than a specific ratio of duty cycle period by a predetermined period. For example, the duration period of the above-mentioned discharging process is greater than 75% of the duty cycle period by a predetermined period. Thus, during the delayed turned-OFF period of the switches Q5-Q10, a negative current of the inductor L1 will flow through a parasitic diode of the switch Q5, to charge a parasitic capacitor of the switch Q1. As a result, the voltage across the switch Q1 will be reduced, for achieving soft switching. In one embodiment, a zero voltage switching (ZVS) can be achieved by adjusting the predetermined period.

In one embodiment, the above-mentioned resonant switching power converter 30 can be a bi-directional resonant switching power converter. In one embodiment, a voltage conversion ratio of the input voltage Vin to the output voltage Vout of the above-mentioned resonant switching power converter 30 is 4:1, 3:1 or 2:1. In one embodiment, a voltage conversion ratio of the above-mentioned resonant switching power converter 30 can be flexibly adjusted. For example, in the charging process and in the discharging process, through controlling the switch Q7 to be kept ON while the switches Q4 and Q10 to be kept OFF, the voltage conversion ratio of the resonant switching power converter 30 can be adjusted to 3:1. For another example, in the charging process and in the discharging process, through controlling the switch Q6 to be kept ON while the switches Q9, Q3, Q7, Q4 and Q10 to be kept OFF, the voltage conversion ratio of the resonant switching power converter 30 can be adjusted to 2:1.

Figure 4:
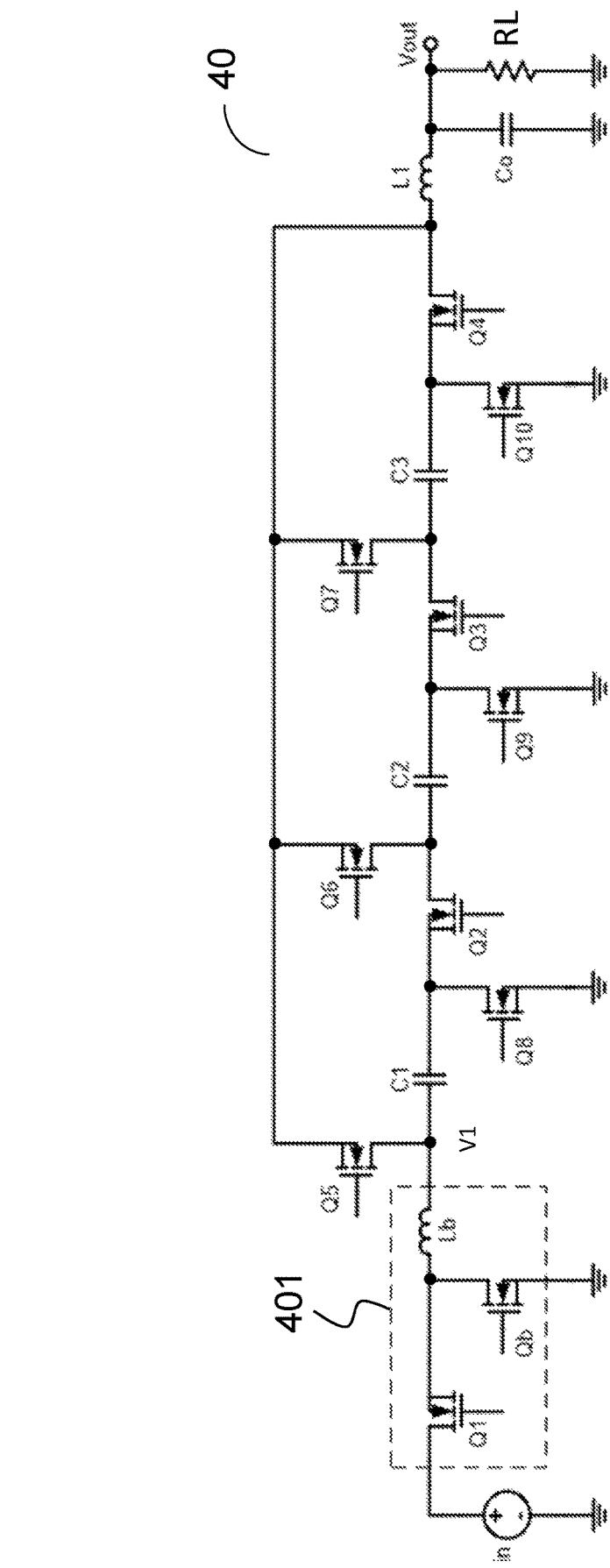
FIG. 4 shows a schematic circuit diagram of a resonant switching power converter according to yet another embodiment of the present invention.

Please refer to FIG. 4, which shows a schematic circuit diagram of a resonant switching power converter according to yet another embodiment of the present invention. The resonant switching power converter 40 of this embodiment of FIG. 4 is different from the resonant switching power converter 30 in the previous embodiment of FIG. 3, in that: the resonant switching power converter 40 of this embodiment comprises a previous stage converter 401, which is configured to operably convert an input voltage Vin to a voltage V1. The previous stage converter 401 is coupled between the input voltage Vin and a capacitor C1. The previous stage converter 401 includes: a previous stage inductor Lb and a switch Q1. The previous stage inductor Lb is connected in series to the switch Q1. The previous stage inductor Lb functions, on one hand, as an inductive energy storing device in previous stage converter 401, and on the other hand, the previous stage inductor Lb is connected in series to the inductor L1 during the duration period (Ton1) of the above-mentioned charging process, to function also as a charging inductor. The switch Q1 of the previous stage converter 401 can function as the switch Q1 of the resonant switching power converter 30 in the previous embodiment of FIG. 3. The rest of the devices of this embodiment of FIG. 4 operate in a similar way as the resonant switching power converter 30 in the previous embodiment of FIG. 3, so the details thereof are not redundantly repeated here. In one embodiment, the previous stage converter 401 includes: a buck converter, a boost converter, a buck-boost converter, an inverting converter or an inverting-boost converter, as shown in FIGS. 6A-6J.

Please refer to FIG. 5A, which illustrates waveform diagrams of operation signals and inductor currents corresponding to a charging process and a discharging process in an embodiment according to the present invention. Please refer to FIG. 2A along with FIG. 5A. In the embodiment shown in FIG. 5A, the operation signals G1~G4 corresponding to the switches Q1~Q4 are at high level in the charging process, whereas, the operation signals G5~G10 corresponding to the switches Q5~Q10 are at high level in the discharging process. In the embodiment shown in FIG. 5A, the duration period of the charging process is substantially equal to 50% of the duty cycle period. As a result, the switch Q1 can be switched at a time point when the current flowing therethrough is at a very low level of its positive half wave, so as to achieve soft switching (i.e., the switch Q1 can be switched at a time point when the current IL1 flowing through the charging inductor L1 is substantially equal to zero). In one embodiment, a zero current switching (ZCS) can be achieved.

Please refer to FIGS. 5B-5C, which illustrate waveform diagrams of operation signals and inductor currents corresponding to a charging process and a discharging process in an embodiment according to the present invention. Please refer to FIG. 2A along with FIG. 5B. In the embodiment shown in FIG. 5B, the operation signals G1~G4 corresponding to the switches Q1~Q4 are at high level in the charging process, whereas, the operation signals G5~G10 corresponding to the switches Q5~Q10 are at high level in the discharging process. In the embodiment shown in FIG. 5B, the duration period of the charging process is smaller than 50% of the duty cycle period by a predetermined period T1. Thus, after the switches Q1-Q4 have been turned OFF, a little amount of current remains, which flows through the charging inductor L1 to take away accumulated charges stored in a parasitic capacitor of the switch Q10 via the parasitic diode of the switch Q4, so that the voltage across the switch Q10 can be reduced, thus achieving soft switching. In one embodiment, a zero voltage switching (ZVS) can be achieved by adjusting the predetermined period T1.

Please refer to FIG. 2A along with FIG. 5C. In the embodiment shown in FIG. 5C, the operation signals G1~G4 corresponding to the switches Q1~Q4 are at high level in the charging process, whereas, the operation signals G5~G10 corresponding to the switches Q5~Q10 are at high level in the discharging process. In the embodiment shown in FIG. 5C, the duration period of the discharging process is greater than 50% of the duty cycle period by a predetermined period T2+T3. Thus, during the delayed turned-OFF period of the switches Q5-Q10, a negative current of the discharging inductor L2 will flow through a parasitic diode of the switch Q5, to charge a parasitic capacitor of the switch Q1. As a result, the voltage across the switch Q1 will be reduced, for achieving soft switching. In one embodiment, a zero voltage switching (ZVS) can be achieved by adjusting the predetermined period T2+T3.

Figure 5D:
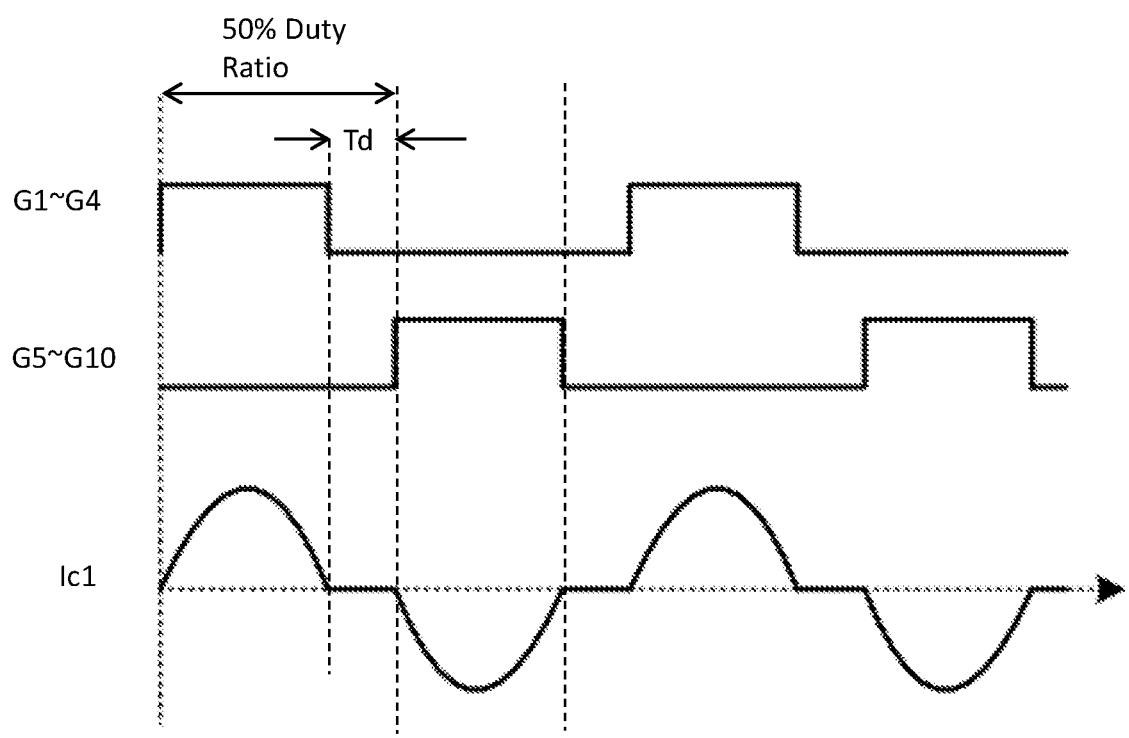
FIG. 5D illustrates waveform diagrams of operation signals and a capacitor current corresponding to a charging process and a discharging process.
Figure 6A:
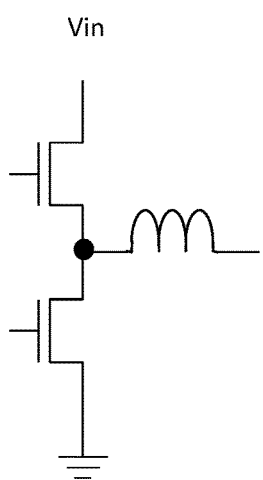
FIGS. 6A-6J show buck, boost, inverting, buck-boost and inverting-boost converters, respectively.
Figure 6B:
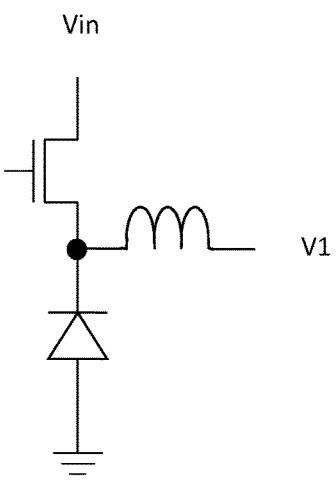
Figure 6C:
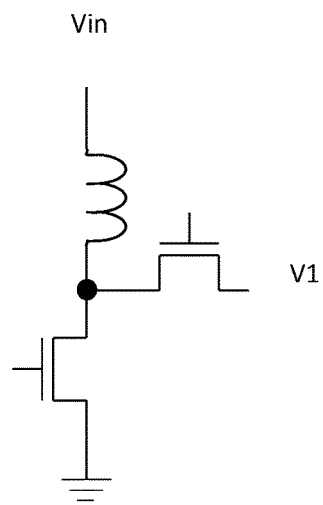
Figure 6D:
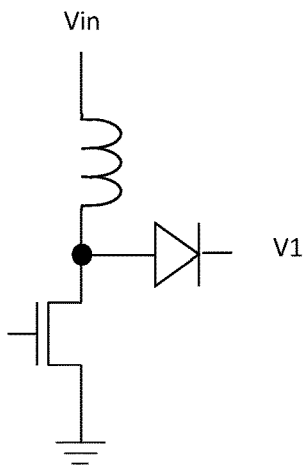
Figure 6E:
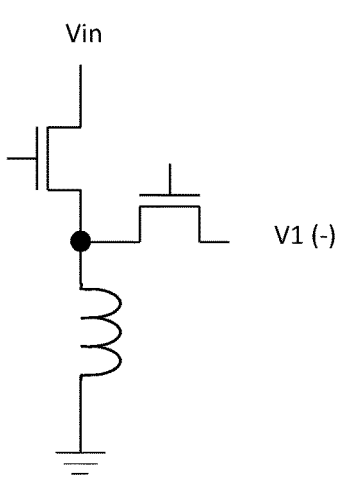
Figure 6F:
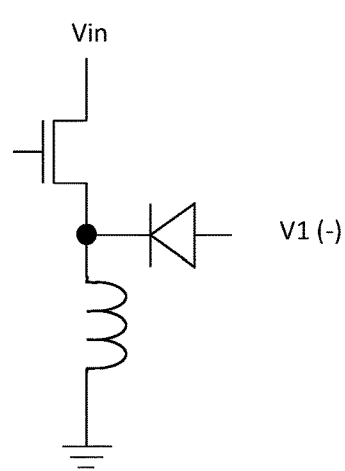
Figure 6G:
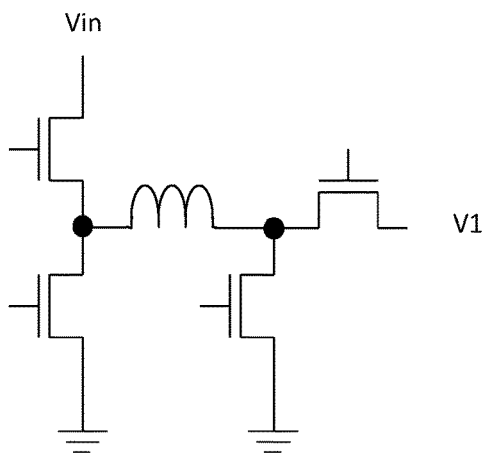
Figure 6H:
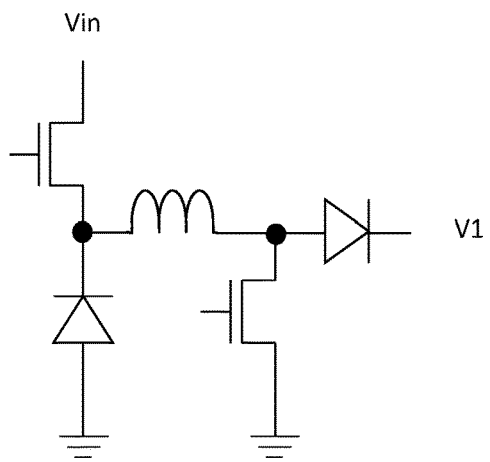
Figure 6I:
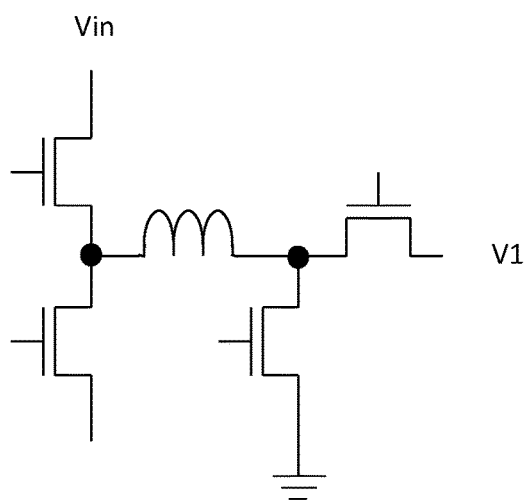
Figure 6J:
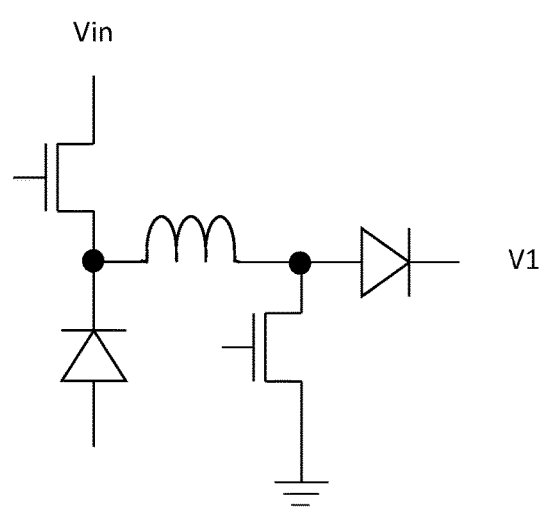

Note that the embodiment of FIG. 5B and the embodiment of FIG. 5C can be implemented together or alone. Besides, please refer to FIG. 5D, which illustrates waveform diagrams of operation signals and a capacitor current corresponding to a charging process and a discharging process in another embodiment of the present invention. Please refer to FIG. 2A along with FIG. 5D. As shown in FIG. 5D, in this embodiment, the duration period of the charging process and the duration period of the discharging process can be adjusted by adding a dead time period Td in between. In this embodiment, the ratio of the input voltage Vin to the output voltage Vout can be more flexibly adjusted.

Figure 7:
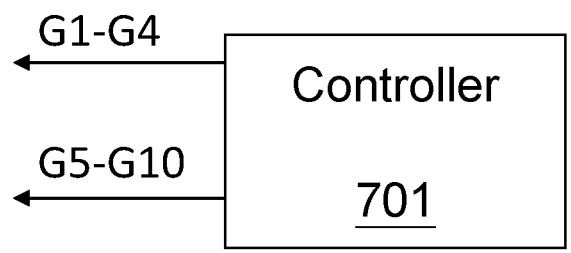
FIG. 7 shows an embodiment of a controller in a resonant switching power converter.

FIG. 7 shows an embodiment of a controller in a resonant switching power converter. As shown in FIG. 7, the resonant switching power converter of the present invention can comprise a controller 701. The controller 701 is coupled to the switches Q1-10 and is configured to operably generate the operation signals G1-G4 and G5-G10, which are outputted to control the switches G1-G4 and the switches G5-G10, respectively.

It is noteworthy that, as one of average skill in the art readily understands, that "turned-ON time point and turned-OFF time point of the switches are substantially synchronous with a start time point and an end time point of the positive half wave of the charging resonant current of the charging process", in realistic circuit implementation, can be achieved as that the turned-ON time point and turned-OFF time point of the switches are exactly the same as the start time point and end time point of the positive half wave of the charging resonant current of the charging process, or, due to signal transmission delay or intentionally design, a constant period exists between the turned-ON time point and turned-OFF time point of the switches and the start time point and end time point of the positive half wave of the charging resonant current of the charging process. Also, as one of average skill in the art readily understands, that "turned-ON time point and turned-OFF time point of the switches are substantially synchronous with a start time point and an end time point of the positive half wave of the discharging resonant current of the discharging process", in realistic circuit implementation, can be achieved as that the turned-ON time point and turned-OFF time point of the switches are exactly the same as the start time point and end time point of the positive half wave of the discharging resonant current of the discharging process, or, due to signal transmission delay or intentionally design, a constant period exists between the turned-ON time point and turned-OFF time point of the switches and the start time point and end time point of the positive half wave of the discharging resonant current of the discharging process.

The present invention provides a resonant switching power converter as described above, which has many merits. According to the circuitry proposed by the present invention, the present invention can reduce the number of the inductor to only one single inductor; such one single inductor can function as a charging inductor or a discharging inductor at different periods. Besides, the present invention can reduce voltage stress; all capacitors can have an identical rated current and an identical rated voltage; capacitors of a smaller size can be used. Moreover, the present invention can perform resonant operation, so as to achieve soft switching such as zero current switching (ZCS) or zero voltage switching (ZVS). In addition, the present invention can adjust the voltage conversion ratio in a more flexible fashion, and, the present invention can combine the inductor with a previous stage converter. Furthermore, the present invention can perform bi-directional operation.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant switching power converter, which is configured to operably convert an input voltage to an output voltage; the resonant switching power converter comprising:
    a plurality of capacitors;
    a plurality of switches, which are coupled to the plurality of capacitors, wherein the plurality of switches switch electrical connection relationships of the plurality of capacitors according to corresponding operation signals; and
    one or plural inductors, wherein the plural inductors respectively serve as one single charging inductor and one single discharging inductor, or the one inductor operates both in a charging process and in a discharging process, wherein the one single charging inductor is connected in series to at least one of the plurality of capacitors, and the one single discharging inductor is connected in series to at least one of the plurality of capacitors, or the one inductor is connected in series to at least one of the plurality of capacitors;
    wherein in the charging process, by switching the switches, a series connection of the plurality of capacitors and the one single charging inductor is formed between the input voltage and the output voltage, whereby a single charging path is formed, wherein a turned-ON time point and a turned-OFF time point of the switches in the charging process are synchronous with a start time point and an end time point of a positive half sinusoidal wave of a charging resonant current of the charging process, wherein a switching frequency of the switches in the charging process is related to a charging resonant frequency of the charging process;
    wherein in the discharging process, by switching the switches, each capacitor and one of the one single discharging inductor are connected in series between the output voltage and a ground voltage level, whereby a plurality of discharging paths are formed, wherein a turned-ON time point and a turned-OFF time point of the switches in the discharging process are synchronous with a start time point and an end time point of a positive half sinusoidal wave of a discharging resonant current of the discharging process, wherein a switching frequency of the switches in the discharging process is related to a discharging resonant frequency of the discharging process;
    wherein the charging process and the discharging process are arranged in a repeated, alternating manner, so as to convert the input voltage to the output voltage;
    wherein the one or plural inductors are hardware components;
    wherein in the discharging process, by switching the switches, a parallel connection of the plurality of capacitors is formed, which is connected in series to the single discharging inductor or the one inductor;
    wherein the charging resonant frequency is a resonant frequency of a resonant circuit formed by the single charging inductor or the one inductor and the corresponding capacitors;
    wherein the discharging resonant frequency is the resonant frequency of the resonant circuit formed by the single discharging inductor or the one inductor and the corresponding capacitors.

2. The resonant switching power converter of claim 1, wherein an inductance of the single charging inductor is equal to an inductance of the single discharging inductor.

3. The resonant switching power converter of claim 1, wherein the at least one charging inductor and the at least one discharging inductor are one same single inductor, wherein in the discharging process, by switching the switches, a parallel connection of the plurality of capacitors is formed, which is connected in series to the same single inductor.

4. The resonant switching power converter of claim 1, wherein in the charging process and in the discharging process, the resonant switching power converter changes a voltage conversion ratio of the input voltage to the output voltage by keeping at least one of the plurality of switches to be ON and keeping at least two of the plurality of switches to be OFF.

5. The resonant switching power converter of claim 1, further comprising:
    a previous stage converter having a previous stage inductor, wherein the previous stage inductor is configured to operably assist the at least one charging inductor.

6. The resonant switching power converter of claim 5, wherein the previous stage converter includes: a buck converter, a boost converter, a buck-boost converter, an inverting converter or an inverting-boost converter.

7. The resonant switching power converter of claim 1, wherein the charging resonant frequency is identical to the discharging resonant frequency.

8. The resonant switching power converter of claim 1, wherein the charging resonant frequency is different from the discharging resonant frequency.

9. The resonant switching power converter of claim 1, wherein a zero voltage switching is achieved by adjusting a duration period of the charging process.

10. The resonant switching power converter of claim 1, wherein a zero voltage switching is achieved by adjusting a duration period of the discharging process.

11. The resonant switching power converter of claim 1, wherein the resonant switching power converter is a bi-directional resonant switching power converter.

12. The resonant switching power converter of claim 1, wherein a voltage conversion ratio of the input voltage to the output voltage of the resonant switching power converter is 4:1, 3:1 or 2:1.

13. The resonant switching power converter of claim 1, wherein a duration period of the charging process does not overlap with a duration period of the discharging process.

14. The resonant switching power converter of claim 1, further comprising:
   a controller, which is coupled to the plurality of switches, wherein the controller is configured to operably generate the operation signals.

* * * * *